United States Patent [19]

Barker et al.

[11] Patent Number: 5,397,379

[45] Date of Patent: Mar. 14, 1995

[54] PROCESS AND ADDITIVE FOR THE LADLE REFINING OF STEEL

[75] Inventors: Bruce J. Barker, Stow; William C. Weber, Cortland; William J. West, Warren, all of Ohio

[73] Assignee: Oglebay Norton Company, Cleveland, Ohio

[21] Appl. No.: 124,530

[22] Filed: Sep. 22, 1993

[51] Int. Cl.$^6$ ............................................. C21C 7/076
[52] U.S. Cl. ........................................ 75/319; 75/303
[58] Field of Search ................... 75/303, 305, 306, 319

[56] References Cited

U.S. PATENT DOCUMENTS

| | | | |
|---|---|---|---|
| 933,357 | 9/1909 | Baraduc-Muller | 75/303 |
| 1,335,370 | 3/1920 | Ellis | 75/303 |
| 1,459,712 | 6/1923 | Bauret | 75/303 |
| 2,079,901 | 5/1937 | Davidson | 75/303 |
| 2,237,485 | 4/1941 | Hardt | 75/303 |
| 2,276,671 | 3/1942 | Rentachler et al. | 75/303 |
| 2,361,416 | 10/1944 | Reece | 75/303 |
| 2,993,761 | 7/1961 | Erasmus | 23/208 |
| 3,027,227 | 3/1962 | Coxey | 75/130 |
| 3,197,306 | 7/1965 | Osborn et al. | 75/130 |
| 3,314,782 | 4/1967 | Arnaud | 75/57 |
| 3,320,052 | 5/1967 | Bowden | 75/53 |
| 3,436,209 | 4/1969 | Lojas | 75/53 |
| 3,585,025 | 6/1971 | Obst et al. | 75/54 |
| 3,649,249 | 3/1972 | Halley et al. | 75/96 |
| 3,704,744 | 12/1972 | Halley et al. | 164/82 |
| 3,754,897 | 8/1973 | Derham et al. | 75/96 |
| 3,788,840 | 1/1974 | Koenig et al. | 75/94 |
| 3,861,906 | 1/1975 | Tipnis et al. | 75/124 |
| 3,897,244 | 7/1975 | Murton | 75/53 |
| 3,899,324 | 8/1975 | Corbett | 75/94 |
| 3,926,246 | 12/1975 | Corbett et al. | 164/56 |
| 3,957,502 | 5/1976 | Cull et al. | 75/58 |
| 3,964,899 | 6/1976 | Jones et al. | 75/53 |
| 3,993,474 | 11/1976 | Roberts | 75/94 |
| 4,039,320 | 8/1977 | Uemura | 75/58 |
| 4,043,798 | 8/1977 | Nashiwa et al. | 75/53 |
| 4,060,406 | 11/1977 | Jones | 75/12 |
| 4,102,690 | 7/1978 | Koper | 106/38.28 |
| 4,127,407 | 11/1978 | Eitel et al. | 75/53 |
| 4,134,946 | 1/1979 | Novy Velinger | 264/63 |
| 4,137,072 | 1/1979 | Kawakami et al. | 75/58 |
| 4,139,369 | 2/1979 | Kandler et al. | 75/58 |
| 4,142,887 | 3/1979 | Luyckx | 75/58 |
| 4,180,397 | 12/1979 | Naylor | 75/58 |
| 4,199,351 | 4/1980 | El Gammal | 75/53 |
| 4,202,692 | 5/1980 | Carini | 75/257 |
| 4,235,632 | 11/1980 | Uher et al. | 75/257 |
| 4,248,631 | 2/1981 | More et al. | 75/257 |
| 4,279,643 | 7/1981 | Jackman | 75/58 |
| 4,280,837 | 7/1981 | Shiozaki et al. | 75/54 |
| 4,303,120 | 12/1981 | Carini | 164/472 |
| 4,312,400 | 1/1982 | Carini | 164/472 |
| 4,317,678 | 3/1982 | Faulring et al. | 75/58 |
| 4,318,822 | 3/1982 | Braun et al. | 252/189 |
| 4,338,142 | 7/1982 | Okuda et al. | 148/26 |
| 4,340,426 | 7/1982 | Tabei et al. | 75/257 |
| 4,342,590 | 8/1982 | Luyckx | 75/58 |
| 4,353,739 | 10/1982 | Batham et al. | 75/58 |
| 4,361,442 | 11/1982 | Faulring et al. | 75/57 |
| 4,364,771 | 12/1982 | Cordier et al. | 75/57 |
| 4,373,948 | 2/1983 | Faulring et al. | 148/2 |
| 4,373,967 | 2/1983 | Roper, Jr. et al. | 75/55 |
| 4,420,333 | 12/1983 | Takahashi et al. | 75/53 |
| 4,435,210 | 3/1984 | Hirokawa et al. | 75/53 |
| 4,462,834 | 7/1984 | LaBate | 75/257 |
| 4,528,035 | 7/1985 | Simpson, Jr. et al. | 75/257 |
| 4,531,972 | 7/1985 | Gueussier et al. | 75/58 |
| 4,541,867 | 9/1985 | Neelameggham et al. | 75/58 |
| 4,570,692 | 2/1986 | Wilson | 164/56.1 |
| 4,586,956 | 5/1986 | Labate | 75/58 |
| 4,601,751 | 7/1986 | Brandenberger et al. | 75/130 R |
| 4,612,046 | 9/1986 | Orcutt | 75/303 |
| 4,643,766 | 2/1987 | Kieger | 75/51.4 |
| 4,652,308 | 3/1987 | Nakashima et al. | 75/49 |
| 4,695,318 | 9/1987 | Knauss, Jr. et al. | 75/51.1 |
| 4,705,561 | 11/1987 | Green | 75/58 |
| 4,708,737 | 11/1987 | Skach, Jr. et al. | 75/58 |
| 4,801,328 | 1/1989 | Canfield | 75/58 |
| 4,814,005 | 3/1989 | Thompson | 75/24 |
| 4,842,642 | 6/1989 | Bowman | 75/10.58 |
| 4,849,165 | 7/1989 | Schaefer | 420/23 |
| 4,880,463 | 11/1989 | Saad | 75/257 |
| 4,943,411 | 7/1990 | Henych et al. | 423/566 |
| 4,956,009 | 9/1990 | Robison, Jr. | 75/307 |
| 5,002,733 | 3/1991 | Breton et al. | 420/578 |
| 5,007,958 | 4/1991 | Chung et al. | 75/330 |
| 5,028,257 | 7/1991 | Tomkins et al. | 75/305 |
| 5,085,691 | 2/1992 | Nakonechny et al. | 75/546 |
| 5,201,941 | 4/1993 | Wells | 75/414 |

FOREIGN PATENT DOCUMENTS

| | | | |
|---|---|---|---|
| 0266527 | 11/1986 | Japan | 75/303 |
| 1-96322 | 4/1989 | Japan . | |
| 2-77516 | 3/1990 | Japan . | |
| 0395158 | 7/1933 | United Kingdom . | |
| 0971573 | 11/1982 | U.S.S.R. | 75/303 |
| 1002392 | 3/1983 | U.S.S.R. . | |
| 1525213 | 11/1989 | U.S.S.R. | 75/303 |

*Primary Examiner*—Scott Kastler
*Attorney, Agent, or Firm*—Jones, Day, Reavis & Pogue

[57] ABSTRACT

A process of refining steel in a ladle using solid granules or briquettes made from recycled LMF slag and raw materials to make a desulfurizing addition, a slag conditioner or synthetic refining slag is described. The preferred recycled LMF slag material generally comprises of 35% to about 65% CaO; 10% to about 35% $Al_2O_3$; 1% to about 10% $SiO_2$; 3% to about 15% MgO; 0.3% to about 10% FeO; 0.1% to about 5% MnO; 0% to about 0.5% $P_2O_5$; and 0.1% to about 0.5% S. The ladle refining additive comprises from about 10% to about 90% of a recycled ladle metallurgy furnace slag and the balance of raw materials selected from the group consisting of: a calcium oxide source; soda ash; fluorspar; borax; calcium carbonate; aluminum source; calcium aluminate; alumina source; metallic calcium, magnesium, sodium and their oxides, fluorides and carbides; and mixtures of all of the foregoing.

48 Claims, No Drawings

PROCESS AND ADDITIVE FOR THE LADLE REFINING OF STEEL

FIELD OF INVENTION

The present invention relates to the ladle refining of steel with a surface slag covering. More specifically, the present invention relates to the utilization of solid, preferably briquetted, recycled ladle metallurgy furnace (LMF) slag as a flux in slag-making additions including desulfurizers, slag conditioners and synthetic slags. The LMF slag is premelted and recycled as a portion of a granular addition, or a briquetted mixture of fine powders mixed with raw materials.

BACKGROUND OF THE INVENTION

Historically, steel production utilizes blast furnace iron and a scrap charge in a Basic Oxygen Furnace ("BOF") or scrap melting in an electric arc furnace to produce ingots of cast steel for reheating and rolling into manufacturing stock. Increasingly demanding applications have led to the development of more stringent physical and chemical specifications for the final steel products.

The ladle metallurgy furnace (LMF) is an additional steel refining step that has become a widely used tool to ensure consistent conformance to the rigid steelmaking requirements set by continuous casters. This additional refining step lowers the level of elements such as sulfur and phosphorous and decreases the content of non-metallic inclusions such as alumina and various sulfide and oxide species. The LMF facilitates the efficient production of steel in that specific chemical and thermal levels are rapidly achieved for meeting continuous caster delivery schedules. In the ladle refining of steel, a surface slag covering is required to provide specific chemical and physical functions. The slag composition is designed for the different grades of steel being produced with the majority requiring desulfurization. Regardless of the chemical refining requirements of the slag, it is advantageous for the ladle slag to become as fluid as possible immediately upon tapping the metal from the furnace into the ladle.

In the LMF, electric arcs from graphite electrodes impinge on the steel surface in the refining ladle to melt the top slag for efficient molten steel refining and to provide rapid heating to quickly achieve casting temperature specifications. The resulting molten slag then exists as a homogeneous, liquid refining medium when fluidity is combined with the correct refining slag chemistry. The ladle metallurgy furnace slag can act as a component of a desulfurizing addition, a slag conditioner to deoxidize the carryover or turndown slag from the previous steelmaking process, or a synthetic slag to refine the steel composition when slag deoxidization is not necessary. Additionally, a ladle metallurgy facility may be used that does not incorporate a furnace, but is strictly a station for alloying and stirring. Additional heat may be provided by the injection of oxygen and aluminum.

In order to improve delivery times of the desired quality of steel to the steel caster refining slags must rapidly achieve fluidity upon tapping the steel from the melting furnace into the refining transfer ladle to expedite chemical processing of molten steel in the ladle. Rapid and efficient chemical refining of steel requires large quantities of lime in solution within a top slag layer to provide the high basicity needed for maximum sulfur capacity to promote sulfur and phosphorus transfer between the steel and the slag. Basicity has been traditionally defined as the slag % $CaO$/% $SiO_2$ ratio (the "V-ratio") and it is well known that a highly basic fluid slag is beneficial in the removal of sulfur and phosphorus from a ladle of molten steel. With respect to the V-ratio, a number less than 1 is acidic and a number more than 1 is basic. The reaction at the slag/metal interface between calcium oxide in the slag and dissolved sulfur in molten steel produces calcium sulfide that remains stable within the top slag layer as long as a reducing chemistry is maintained. By increasing the refining slag fluidity, the effective slag interfacial area available to contact the molten steel surface is likewise increased.

A ladle refining slag addition based on lime may additionally contain a variety of materials including but not limited to fluorspar, alumina (from a variety of different sources including bauxite and recycled materials such as pit solids), silica, iron oxide, titanium dioxide, sodium oxide, magnesia, calcium aluminate, limestone and dolomitic limestone, metallic deoxidizers such as aluminum, silicon, and manganese and desulfurizers such as calcium, sodium and magnesium.

The calcium oxide used is generally soft burnt lime as the reactivity of this lime is increased due to its open pore structure and is superior to hard burnt lime, which tends to develop a harder, less porous surface and is therefore less reactive in a refining slag addition. The lime must be continually fluxed to achieve maximum refining rates within the slag. As calcium sulfide forms on the surface of the lime during the desulfurizing reaction, it forms a coating which effectively seals off the remaining inner core of lime from participating in further reaction with sulfur. This not only limits the reaction rate but also limits the reaction efficiency as the inner portion of the lime particle which never enters into the desulfurizing reaction. The calcium sulfide product must be fluxed off of the remaining calcium oxide core on each lime particle for the reaction to continue at maximum rates. Since lime alone has a melting point of approximately 4700° F., either a powerful heat source such as an electric arc or chemical fluxing methods must be employed to render the lime fluid.

In addition to calcium sulfide acting as a barrier against furthering the desulfurizing reaction, lime in the slag may additionally be coated with a layer of dicalcium silicate from a reaction with silica in the slag. The melting temperature of this refractory compound is around 3800° F. and therefore must be prevented from forming on the surface of the individual lime particles or must be fluxed off of the lime to prevent the lime from being essentially deactivated and prevented from going into solution.

A fluid slag is best utilized for desulfurizing when it is vigorously mixed with the steel through dynamic physical particle interaction. The full body of the separate slag and metal masses may enter the slag/metal reaction interface where chemical refining is most rapid. Fluidity and slag/metal mixing therefore effectively increases the interfacial area of the slag to accelerate the refining reactions.

Steelmaking temperatures are traditionally 2700° F.–3000° F. Accordingly, solvents for taking lime into a liquid state must be employed to create a final slag product that has melting point beneath this threshold level. To facilitate maximum refining rates, the dissolution of lime is required immediately upon tapping the melted steel into the ladle. In this regard, agents which provide this physical fluxing effect while remaining compatible with the chemical requirements of the slag are required. The development of slag-making additions with the attendant means to flux lime has been widely practiced.

Fluorspar has traditionally been the most commonly used fluxing agent for lime. However, its corrosive effect on ladle refractories as well as its reaction with carbon and silicon to produce environmentally and physically harmful carbon tetrafluoride and silicon tetrafluoride has led to its elimination from many processes and a search for a replacement flux in the ladle refining of steel. The production of these harmful compounds also causes the fluorine in the slag to evaporate in the gaseous form and thereby depletes the slag of this fluidizing substance. The top slag layer will therefore become very stiff and unworkable if left too long on top of the steel.

Alumina on the other hand is very stable and when fluid, can chemically combine with lime to form dicalcium aluminate which has a melting point of around 2550° F. The chemical combination of CaO and $Al_2O_3$ in equal weights creates the lowest melting point mixture possible so that it stays fluid at steelmaking temperatures. Any deviation from this 50/50 balance will cause the melting point of the material to increase unless other oxide impurities are present in which case the melting point is again decreased.

Premelted calcium aluminates have been employed as synthetic steelmaking slag desulfurizers since around 1937 in France, when Rene Perrin utilized a separate furnace to provide a molten addition of 50% calcium oxide and 50% aluminum oxide to a ladle of molten deoxidized steel which achieved an 80% drop in sulfur from 0.025% to 0.005% during furnace tapping. This slag addition process contained the necessary desulfurization ingredients of high temperature, high basicity and low oxygen potential with vigorous stirring into the deoxidized steel. Although greatly successful in desulfurizing, the cost of the process is prohibitive.

The addition of a premelted but solid calcium aluminate is very effective in slag fluxing and is usable as a desulfurizing agent. However, it too is very expensive. Lower cost substitutes include the use of a byproduct of ferrovanadium manufacture that consists of a large percentage of premelted lime and alumina along with vanadium pentoxide. Although this product does not have a 50/50 weight ratio of lime to alumina, the other tramp or other lower melting point oxides help to decrease the melting point considerably. This is undesirable since vanadium can be unacceptable in cerain grades of steel.

Different techniques have been used to combine lime and alumina on a molten steel surface and allow the electric arc of an electric melting or refining furnace to melt and fuse the two compounds together. An approach using the generation of chemical heat within a self-fluxing desulfurizing addition is detailed in U.S. Pat. No. 4,342,590 where finely divided iron oxide is mixed with aluminum and lime. The heat generated by the reaction between aluminum and the oxygen in the iron oxide helps to melt the lime and the resulting aluminum oxide into a calcium aluminate. This Thermit reaction is very effective for heat generation but is expensive since aluminum is consumed by the iron oxide additions to provide the thermal reaction for lime melting and fluxing.

Silica additions also cause a fluxing action on lime with the resulting substance being a lime-silica wollastonite compound. U.S. Pat. No. 4,695,318 refers to a premelted calcium silicate and fluorspar being used to flux lime in a ladle refining process. This is not acceptable in many refining slag practices as silica is not only detrimental to desulfurizing performance but is also acidic in nature and is very corrosive to the basic refractories used in refining ladles. High silica levels in a refining slag are also known to be deleterious to cleanliness levels in aluminum treated steels.

Another chemical flux for lime-containing slags is liquid iron oxide. Iron oxide is naturally present in steel melting furnace slags and typically exists in quantities of between 10% and 40% in BOF slags. As oxygen is blown into the furnace charge of molten high carbon iron and steel scrap to remove the carbon by formation of carbon monoxide, large quantities of iron are also oxidized and float into the melting slag. When the steel melt is tapped into the transfer ladle, a significant amount of melting slag (also known as carryover or turndown slag) is unavoidably carried over into the ladle with the steel. Although this flux will rapidly cause the lime to go into solution in the slag, its highly oxidizing nature is detrimental to alloy recovery in the steel and to the desulfurizing capacity of the slag. BOF furnace melting slag contains large quantities of highly oxidizing iron oxide that must be physically removed or chemically reduced for desulfurization to continue.

Although large quantities of iron oxide from BOF furnace slags are to be avoided, a smaller, controlled addition of iron oxide in solid form has been used as a flux for high lime quantities in ladle slag additions. Similarly, as taught by U.S. Pat. No. 3,964,899, iron, manganese, titanium and aluminum oxides as well as fluorspar obtained from pit solids waste can be used to flux lime in a furnace refining operation. In this patent, pit solids are described as a waste material from aluminum production containing large percentages of alumina with lesser amounts of lime, silica and magnesia.

The addition of lime with metallic aluminum has been also used to obtain a desulfurizing slag by providing aluminum as a means to absorb the oxygen released from the calcium oxide when it becomes displaced by the sulfur. This effectively removes the released oxygen from the reaction zone and prevents it from further reacting with the sulfide product and causing sulfur reversion from the slag to the steel.

U.S. Pat. No. 4,142,887 describes a ladle desulfurizer where a mixture of particulate metallic aluminum, fluorspar and lime is added to deoxidize and desulfurize the steel while forming a fluidized slag. This slag can then act to further deoxidize and desulfurize the steel upon subsequent mixing but can additionally provide atmospheric coverage and protection to prevent reversion of the removed sulfur back into the steel melt. U.S. Pat. No. 4,060,406 refers to a slag conditioner for electric arc steelmaking whereby the addition comprises aluminum, alumina and fluorspar and an alkali metal carbonate. This addition specifies that the raw materials employed should ideally be low in sulfur, phosphorus and iron oxide but that a variety of materials are available commercially including waste materials such as pit solids and ball mill dust.

A synthetic slag addition is generally required if iron oxide levels in the slag are lower, such as when higher carbon BOF steels are produced or when electric furnace melting furnaces are tapped with a minimum of carryover slag. This provides coverage to the ladle surface for atmospheric protection of metallic alloy additions such as aluminum and silicon which have been added to the steel to produce specified levels of these elements. Readily available oxygen sources such as the atmosphere or a top slag high in weak oxides will cause the alloying elements to be oxidized into the slag requiring an expensive re-alloying procedure.

This synthetic slag addition therefore provides atmospheric protection and dilutes the carryover slag so that the weak acidic oxides in the melting slag are not available to oxidize the alloys dissolved in the steel bath. Thermal insulation of the molten bath is additionally provided by the slag as rapid heat loss via radiation from the steel is blocked by the slag.

Physical refractory protection from the electric arc in the ladle refining furnace is facilitated by the top slag. If a surface slag layer is not used in the arc refining of steel, the electric arc will experience flare and rebound off the steel and refractory lining in the ladle in a manner severe enough to cause a break in the ladle refractory with the attendant loss of steel from the ladle. The top slag is therefore required for physical protection of the steel chemical levels and ladle refractories.

Additionally, slag fluidity is essential in modern steelmaking to promote absorption of nonmetallic inclusions from the steel bath since inclusions will cause clogging of casters and result in production losses and increased costs. Nonmetallic inclusions also cause surface defects in the final rolled steel, making a lower quality steel.

Synthetic slag patents have referred to the use of recycled waste materials in the fluidization of lime-rich refining ladle slags. U.S. Pat. No. 3,320,052 teaches the use of a particulate dust collected from aluminum production as a flux for steelmaking slag additions. This material contains lime, fluorine, alumina and cryolite (sodium aluminum flouride) and was processed, mixed and sometimes briquetted for production of a larger size to facilitate handling. U.S. Pat. No. 4,039,320 describes a briquetted mixture of aluminum and lime for addition to a melting furnace during the reducing period in the refining process in the making of stainless steel in order to chemically reduce the acidic oxides in the slag and increase the basicity of the slag. Metallic calcium bonded to a calcium aluminate flux is described in U.S. Pat. No. 4,435,210 as an addition for the deoxidation, desulfurization and dephosphorization of molten steel by ladle refining. Waste slags from melting and oxidizing furnaces have been described in differing applications for molten steel refining. U.S. Pat. No. 4,364,771 mentions the use of a granulated slag with a V-ratio higher than 1 in a mixture with magnesium shot for injection into pig iron to desulfurize and nodularize the metal. The granulated slag acts as a flow promoter in the injection process and facilitates desulfurizing within the metal. Recycled slag use is outlined in U.S. Pat. No. 2,361,416 whereby recycled cupola melting slag is used as a flux for limestone in the subsequent furnace melt. Specified is the requirement for a measure of fresh limestone with each slag charge to dilute the impurities in the recycled slag. The addition is detailed as combining recycled slag containing more than 35% silica with a lesser amount of fresh limestone. U.S. Pat. No. 3,897,244 describes using slag a means of fluxing dicalcium silicate from lime particles used in a basic oxygen furnace operation. The slag could be obtained from electric furnaces, open hearth furnaces or basic open hearth converters. In order to act as a flux, the preferred amounts of iron oxide and silica in the slag were 15–30% and 10–16% respectively. This fluxing addition helped the improve the refining reaction during the carbon blow stage of refining.

Ladle refining has been investigated as an area where slag recycling could be used to benefit the fluxing into solution of lime. U.S. Pat. No. 4,842,642 details the use of blast furnace slag as a flux in a ladle refining operation which therefore allows for the elimination of fluorspar. The blast furnace slag employed is described as containing 5–15% alumina and 30–45% silica along with 0–2% phosphorus and 1–2% sulfur. This patent suggests that the mechanism of fluxing is chemical dissolution of the lime into the already-molten recycled slag layer upon addition of the mix to the ladle of molten steel as the slag melts around 2400° F., which is considerably below steelmaking temperatures.

In Japanese patent application No. P-96322, molten steel is refined using a ladle having recycled molten slag remaining from a preceding heat of refining. A small quantity of solid alloy materials and raw slag making material are added to the ladle containing the molten steel and recycled molten slag to form a new slag layer. In this process a lid is placed on the ladle to seal the interior of the ladle and then argon gas is blown into the molten steel so as to stir the molten steel and reduce the atmosphere inside the ladle. Japanese application No. P-96322 uses sensible heat of the molten recycled slag to melt the raw materials into the molten steel and slag. This Japanese process is disadvantageous in that a steel manufacturer can not accurately control the chemistry and weight of the recycled addition. Accordingly, when incorporating raw materials into the molten slag, the raw material effectiveness is diminished through reactions between the raw materials and the molten recycled slag as opposed to reactions between the added raw materials, the steel and the slag in the ladle. Additionally, the Japanese process does not allow for the transfer of the LMF slag to other steel making locations since the LMF slag must remain molten to provide the sensible heat required.

It is therefore an object of the present invention to overcome the problems in the prior art and to provide a material suitable for use as low melting temperature slag-making material that is inexpensive. It is a further object of the present invention to formulate a slag-making composition that achieves a low melting point that is equivalent to calcium aluminate with respect it its fluxing potential, while providing a greater capacity to absorb non-metallic inclusions into the top slag solutions when these products of steel deoxidation and desulfurization are floated into the interface between the steel and slag. It is an object to provide an addition that avoids excessive silica, sulfur, and phosphorus levels, and to permit the addition of the ladle additive both during and after tapping the steel from the furnace into the ladle. Furthermore, the present invention avoids the undesirable levels of titanium and vanadium that may be present in calcium aluminate and vanadium slags and further limits the amount of weak acidic oxides and fluorspar as fluxes for the lime since these are detrimental as discussed above.

Moreover, because the LMF slag of the present of the invention is a solid, it permits the precise control in terms of chemistry and weight of each component in the addition. The present invention can also, therefore, be added during or after the molten steel is tapped into ladle. Because the present invention can be added at various stages of tapping, it can be taylored to act specifically upon the steel, such as in desulfurizing, or on the carryover slag in the slag conditioning application. By using the present invention to maximize slag fluidity upon tap, decreased LMF processing times affords a decrease in power consumption and associated wear on the ladle refining system. These processing and handling advantages facilitate timely delivery of the steel to the caster.

Additionally, the present invention can be used by steel manufacturers that do not have an in-house source of the desired LMF slag.

SUMMARY OF THE INVENTION

The present invention uses recycled ladle metallurgy furnace (LMF) slag as a fluidizing addition for chemically fluxing the raw materials, such as a calcium oxide source, e.g., lime, into a fluid mixture within a top slag in a ladle refining application either as a synthetic slag, a slag conditioner or as a desulfurizer.

The present invention overcomes the above described disadvantages of current ladle slag technology by providing an inexpensive, highly effective fluid layer upon the molten steel that melts immediately upon tapping the steel from the melting furnace into the refining transfer ladle. The present invention uses the LMF slag of an LMF refining process having a meltpoint of about or below 2400° F., and recycles it into the ladle addition for refining steel of similar grade. For example, recycled LMF slag from an aluminum killed steel would be usable for an aluminum killed steel of similar grade. Likewise, the LMF slag from a silicon killed steel or aluminum restricted grades, e.g., tire cord steel, would be usable for similar types and grade of steel. LMF slag recycled from re-sulfurized steel would not be acceptable for steel grades requiring desulfurizing. Similarly, LMF slags from aluminum restricted grades are high in silica and are unacceptable for use with aluminum killed steel.

A preferred recycled LMF slag of the present invention has the following composition:

CaO: 35–65%,
$Al_2O_3$: 10–35%,
$SiO_2$: 1–10%,
MgO: 3–15%,
FeO: 0.3–10%,
MnO : 0.1–5%,
$P_2O_5$: 0.01–0.15%, and
S: 0.1–0.5%.

The LMF slag chemistry of the present invention is also advantageous over blast furnace, BOF or melting furnace slag as a refining slag flux addition due to the decreased residual element levels. The previously used slag sources discussed in the prior art contain much higher percentages of sulfur, phosphorus and silica, e.g., blast furnace slag typically contains 2% P, 2% S and 40% $SiO_2$. The reuse of LMF slag thereby adds comparatively less weight in sulfur and phosphorus to the new refining slag when combined with the required raw materials. It would have not been obvious to reuse the LMF slag since it has already functioned in a refining capacity and has acquired deleterious elements from the steel refining process. However, in the present invention, not only is recycled LMF slag diluted with additional raw materials, the recycled slag is not fully saturated with the deleterious materials. The high alumina percentages in the preferred slag of the present invention assists in the low melting chemical composition of the product.

Furthermore, "Falling Slag," a slag having high lime, high alumina, low silica and low FeO, previously believed to be a waste product, is particularly desirable in the present invention. The powdered product of a "Falling Slag" is of a beneficial chemistry and can be used in the present invention as part of a briquetted product.

The preferred recycled LMF slag of the present invention in a solid ladle additive provides a surprising fluxing benefit. Recycling also provides a solution to the slag waste disposal problem. To prepare the LMF slag for reuse in the ladle addition of the present invention, under optimum conditions, the LMF slag is kept separate from other slag sources and then has large metallics magnetically removed. It is then crushed and sized. Although not always necessary, the slag can be dried. Optimally, a dried LMF slag used in this invention contains less than about 2% by weight moisture.

In one embodiment, the solid recycled LMF slag is combined with raw materials into a new ladle metallurgy additive comprising a mixture of about 10% to about 90% recycled, pre-melted solid LMF slag and of about 10% to about 90% of raw materials, based on total weight. (All percentages referred to herein are on a weight basis unless otherwise stated.) The raw materials mixed with the recycled LMF slag are usually selected from the group consisting of: calcium oxide source; soda ash; fluorspar; borax; aluminum source; alumina source; calcium carbonate; calcium aluminate; metallic calcium, magnesium, sodium and their oxides, fluorides and carbides; and mixtures of all the foregoing. Silica may exist as a tramp species in some other raw materials that are being used in the ladle addition of the present invention. Silica is not required and its use is preferably avoided. Likewise, adding silicon will generate silica in the LMF addition and should be avoided if possible. The upper limits of acceptable silica and sulfur content in the recycled LMF slag suitable for this invention are about 10% and 0.5%, respectively.

The calcium oxide source in the present invention is selected from the group consisting of calcium oxide; lime, limestone, dolomite and dolomitic lime. The aluminum source is selected from the group consisting of aluminum, aluminum scrap, aluminum wire, aluminum dross, aluminum powder, aluminum shavings, aluminum punchings, chemically reduced alumina slags, aluminum pit solids, aluminum baghouse dust and recycled aluminum waste sources. The alumina source is selected from a group consisting of alumina, bauxite, recycled waste alumina, waste refractory blast stove brick and calcined alumina. It will be appreciated that although some raw materials may be recycled from other processes, they are virgin raw materials with respect to their use in ladle refining slags. In the present invention, reference is made to sources of chemical compounds or elements as necessary ingredients in any given ladle addition. For example, a source of CaO can be, among others, lime or limestone. The weight percents of compounds used in the present invention refer to the net amount of the desired compound, regardless of the source. For example, a 30% by weight of lime may give a 25% CaO; a 30% addition of limestone may give a 15% weight of CaO; and, a 10% by weight portion of a 70% aluminum dross will provide 7% aluminum in the final ladle addition.

Because the present invention is a solid, the LMF slag can be stored, shipped and used at locations that do not have the desired slag and can be used as a more precise and controlled ladle addition both in terms of chemistry and weight.

As reprocessing this material generally produces granular as well as fine powders, both particle sizes of material are acceptable since the fine powder can be regularly incorporated into a briquetted product. The ladle additive of the present invention can be added as a solid granular mix, but preferably as briquetted mixtures. Briquetting is the physical compaction of fine solids (e.g., those particles that would fall through a 4-mesh screen). Though it may be possible to use a binder, it is preferable to use a binderless briquette, thereby avoiding associated problems of fuming, smoking, moisture, etc. Furthermore, binders can be a source of carbon which can be undesirable in some steel compositions such as ultra low carbon steels. The briquettes used in this invention can be of any size that can be easily handled and packaged. Typically, a briquette is between from about one to about two inches in its largest dimension.

A briquetted mixture contianing fine LMF slag particles provides improved physical and chemical dispersion within the steel refining ladle since each briquette is made of the complete additive composition and has an equal percentage of all of the components in the ladle addition mixture. In this way, rapid chemical dissolution and physical dispersion of discrete particles within the slag is facilitated. Improved physical dynamics of slag assimilation are thereby achieved as the recycled LMF slag melts upon addition and thus encapsulates the remaining raw material components of the addition mix within a liquid slag layer. This layer then acts to contain the individual reaction components to act further upon each other without atmospheric intervention. Any aluminum additions are therefore maximized in chemical efficiency toward slag and metal deoxidation rather than being oxidized via atmospheric or intentionally applied weak oxide sources thereby providing more control of the chemistry of the final steel product.

The present invention may also contain magnesium oxide that helps prevent chemical dissolution of the ladle magnesia refractories that have a solubility limit in typical LMF slags.

The present invention may also be a uniformly mixed granular solid, typically of a size no larger than material that would pass through a screen having one-inch square openings and no smaller than that which would pass through a 20-mesh screen. Furthermore, the recycled LMF slag may be ground and kept separated from the ground raw materials and added to the refining ladle separately in at least two steps.

DESCRIPTION OF THE PREFERRED EMBODIMENTS

The ladle addition of the present invention using recycled LMF slag can be used in a number of refining slag additions including, but not limited to, desulfurizers, slag conditioners and synthetic slags.

When acting as a flux for lime in all slag addition capacities, the amount of recycled LMF slag used is desirably about 10% to about 90% by weight based on the total weight of the mixture with raw materials. If quantities of less than about 10% LMF slag are employed, the immediate fluxing action of raw materials upon addition is impaired and the time to fluidize the top slag layer becomes exceedingly long. If greater than about 90% by weight of the recycled slag is used, the chance of a buildup of deleterious elements in the refining slag layer becomes greater and the refining ability of the resulting top slag is thereby reduced.

More preferably, the amount of LMF slag is from about 20% to about 60%, and still more preferably, about 50% by weight, based on the total weight of the mixture. Additional components and percentages of each depend on the addition requirements desired.

In a synthetic slag capacity, the recycled LMF slag comprises from about 10% to about 90% recycled ladle metallurgy furnace slag, a calcium oxide source sufficient to provide from about 0% to about 90% of calcium oxide, and an alumina source sufficient to provide from about 0% to about 80% of alumina, wherein the calcium oxide and the alumina are not both 0% at the same time.

Preferably the synthetic slag comprises from about 20% to about 80% recycled ladle metallurgy furnace slag, a calcium oxide source sufficient to provide from about 0% to about 55% of calcium oxide, and an alumina source sufficient to provide from about 0% to about 55% of alumina, wherein either the calcium oxide or the alumina is at least about 10%. More preferably, the synthetic slag comprises from about 30% to about 60% recycled ladle metallurgy furnace slag, a calcium oxide source sufficient to provide from about 0% to about 55% of calcium oxide, and an alumina source sufficient to provide from about 0% to about 55% of alumina, wherein either the calcium oxide or the alumina is at least about 10%. Even more preferably, the synthetic slag comprises from about 40% to about 55% recycled ladle metallurgy furnace slag, a calcium oxide source sufficient to provide from about 0% to about 50% of calcium oxide, and an alumina source sufficient to provide from about 0% to about 50% of alumina. In another embodiment, the synthetic slag comprises about 50% recycled ladle metallurgy furnace slag, a calcium oxide source sufficient to provide about 25% of calcium oxide, and an alumina source sufficient to provide about 25% of alumina.

If the addition is made to a strongly aluminum deoxidized steel, then alumina may be replaced in the mix by additional lime since a large amount of alumina will be contributed to the ladle slag from the steel deoxidation reaction. Synthetic slag is usually added to the ladle while the steel is being tapped from the furnace into the ladle, preferably when the ladle is approximately one-quarter filled with molten steel.

An embodiment of the desulfurizer of the present invention comprises from about 10% to about 90% recycled ladle metallurgy furnace slag, a calcium oxide source sufficient to provide from about 0% to about 90% of calcium oxide, an alumina source sufficient to provide from about 0% to about 80% of alumina wherein the calcium oxide and the alumina are not both 0% at the same time, and an aluminum source sufficient to provide from about 1% to about 70% aluminum.

Another desulfurizing ladle additive of the present invention comprises from about 10% to about 60% of recycled ladle metallurgy slag, a calcium oxide source sufficient to provide from about 10% to about 90% of calcium oxide, an alumina source sufficient to provide from about 0% to about 50% of alumina, and a source sufficient to provide from about 1% to about 70% of a source of metal that functions to react with the oxygen that is released from the CaO during the desulfurization.

The source of metal is selected from the group consisting of aluminum, calcium, sodium, magnesium and calcium carbide and mixtures of the foregoing. The aluminum can be from a variety of sources including but not limited to all forms of clean aluminum scrap such as wire, powder, shavings, punchings, dross, pit solids and chemically reduced alumina slags, baghouse dusts and other waste sources.

Another desulfurizing additive of the present invention comprises about 10% to about 60% recycled ladle metallurgy furnace slag, a calcium oxide source sufficient to provide from about 10% to about 80% of calcium oxide, an alumina source sufficient to provide from about 0% to about 50% of alumina, and from about 10% to about 80% of a technical grade calcium carbide.

More preferably, the desulfurizing additive comprises from about 20% to about 60% recycled ladle metallurgy furnace slag, an aluminum source sufficient to provide from about 4% to about 12% of aluminum, a calcium oxide source sufficient to provide from about 20% to about 60% of calcium oxide, an alumina source sufficient to provide from about 0% to about 20% of alumina, and from about 0% to about 20% of fluorspar. The desulfurizing additive even more preferably comprises from about 30% to about 50% of recycled ladle metallurgy furnace slag, an aluminum source sufficient to provide from about 5% to about 10% of aluminum, optimally about 7%, a calcium oxide source sufficient to provide from about 30% to about 50% of calcium oxide, an alumina source sufficient to provide from about 0% to about 10% of alumina and from 0% to about 10% of fluorspar. A desulfurizing slag is usually added to the ladle while the steel is being tapped from the furnace to the ladle, preferably when the ladle is one-quarter filled with molten steel.

In a slag conditioning (slag deoxidation) capacity, the additive of the present invention comprises from about 10% to about 90% recycled ladle metallurgy furnace slag, a calcium oxide source sufficient to provide from about 0% to about 90% of calcium oxide, an alumina source sufficient to provide from about 0% to about 80% of alumina wherein the calcium oxide and the alumina are not both 0% at the same time, and an aluminum source sufficient to provide from about 1% to about 70% aluminum.

Another embodiment of the slag conditioner of the present invention comprises from about 10% to about 90% recycled ladle metallurgy furnace slag, a calcium oxide source sufficient to provide from about 0% to about 60% of calcium oxide, an alumina source sufficient to provide from about 0% to about 60% of alumina, wherein the calcium oxide and the alumina are not both 0% at the same time, and a source sufficient to provide from about 10% to about 70% of a source of metal that acts to deoxidize the iron oxide and manganese oxide in the carryover slag, e.g. the BOF carryover slag. The source of metal may be selected from the group consisting of aluminum, calcium, sodium, magnesium, and calcium carbide and mixtures of the foregoing. The aluminum metal component may be selected from a variety of sources including but not limited to all forms of clean aluminum scrap such as wire, powder, shavings, punchings, dross, pit solids and chemically reduced alumina slags, baghouse dusts and other waste sources.

The slag conditioner more preferably comprises from about 20% to about 60% recycled ladle metallurgy furnace slag, a calcium oxide source sufficient to provide from about 20% to about 60% of calcium oxide, an alumina source sufficient to provide from about 0% to about 30% of alumina, from about 0% to about 10% fluorspar and an aluminum source sufficient to provide from about 10% to about 50% aluminum. A preferred aluminum content in the ladle metallurgy furnace slag conditioning additive is from about 15% to about 30% of the additive. In another embodiment, the slag conditioner comprises from about 10% to about 90% recycled ladle metallurgy furnace slag, a calcium oxide source sufficient to provide from about 0% to about 60% of calcium oxide, an alumina source sufficient to provide from about 0% to about 60% of alumina, wherein the calcium oxide and the alumina are not both 0% at the same time, and from about 10% to about 90% calcium carbide. The slag conditioner of this invention is usually added after the steel was tapped into the ladle and the tapping has been completed.

EXAMPLE 1

The production of consecutive heats of like steel grades were run. One heat utilized a typical prior art commercial synthetic slag of premium premelted calcium aluminate, a desulfurizer, and lime to 200 ton heats in a BOF melt shop and the other, according to this invention, using a briquetted mixture of recycled LMF slag, recycled alumina blast stove brick and high calcium lime with the desulfurizer added separately to allow flexibility in the amount of this product added per heat. Metal and slag analyses were obtained for each heat to permit a full comparative analysis to be performed. Particular attention was given not only to attainment of the chemical specifications of the steel but to the comparative slag chemistries to ensure that equivalent chemical mass balances were obtained with the recycled replacement material as compared with strictly premium raw materials. Each heat utilized 4000 lbs. total slag-making additions as specified in the following comparison:

TABLE 1

| Synthetic Slag with Desulfurizing Addition Comparison (achieved same quality steel) | | | | | |
|---|---|---|---|---|---|
| % of mix | wgt. (lbs) | material | $Al_2O_3$ (lbs) | CaO (lbs) | $SiO_2$ (lbs) |
| Prior Art Practice (Granular): | | | | | |
| 20% | 800 | lime | | 800 | |
| 30% | 1200 | calcium aluminate | 576 | 600 | 24 |
| 50% | 2000 | desulfurizer | 300 | 1360 | |
| Totals: 100% | 4000 | | 876 | 2760 | 24 |
| Normalized percentages: | | | (24%) | (75%) | (1%) |
| Briquetted Recycled LMF Slag Practice: | | | | | |
| 23% | 900 | lime | | 900 | |
| 15% | 600 | recycled LMF slag | 138 | 312 | 36 |
| 12% | 500 | brick | 235 | 10 | 165 |
| 50% | 2000 | desulfurizer | 300 | 1360 | |
| Totals: 100% | 4000 | | 673 | 2282 | 201 |
| Normalized percentages: | | | (22%) | (72%) | (6%) |

The desulfurizer in both slags provided above was the same and was a briquetted mixture of 8% Al, 25% Fluorspar, and the balance lime.

The desulfurizer in both slags provided above was the same and was a briquetted mixture of 8% Al, 25% Fluorspar, and the balance lime.

TABLE 2

Recycled Alumina Brick used in the Recycled LMF Slag in Table 1 size: Maximum ¼ inch chemistry:
| (wt. %) | $Al_2O_3$ | $SiO_2$ | CaO | MgO | FeO |
|---|---|---|---|---|---|
| | 46.8 | 33.4 | 1.9 | 3.6 | 7.3 |

TABLE 3

Recycled LMF Slag used in the Briquette in Table 1

Size: Maximum ¼ inch

| Chemistry: | CaO | $Al_2O_3$ | MgO | $SiO_2$ | FeO | MnO | S | P (wt. %) |
|---|---|---|---|---|---|---|---|---|
| | 52.4 | 23.1 | 7.5 | 5.8 | 3.0 | 0.7 | 0.3 | .06 |

TABLE 4

Slag Chemistries Sampled During the Steel Refining

| Process | | CaO | $Al_2O_3$ | $SiO_2$ | MgO | FeO | $P_2O_5$ | S |
|---|---|---|---|---|---|---|---|---|
| Prior Art: | A | 50.3 | 0.4 | 17.1 | 12.9 | 12.9 | 1.2 | .04 |
| | B | 66.6 | 19.2 | 4.8 | 3.0 | 1.1 | .02 | .13 |
| | C | 61.8 | 18.8 | 5.6 | 5.5 | 2.0 | .03 | .13 |
| | D | 62.4 | 18.1 | 6.1 | 5.9 | 1.9 | .07 | .12 |
| Present Invention: | A | 63.3 | 0.1 | 16.3 | 1.4 | 9.9 | .93 | .08 |
| | B | 63.4 | 20.2 | 7.5 | 2.9 | 1.0 | .03 | .32 |
| | C | 63.3 | 20.4 | 8.6 | 3.5 | 1.0 | .02 | .33 |
| | D | 63.0 | 20.8 | 7.4 | 3.6 | 0.9 | .06 | .30 |

TABLE 5

Steel Metal Chemistry Comparison During the Steel Refining Process (no slag)

| | | S | C | Al | Si | P | Mn |
|---|---|---|---|---|---|---|---|
| Prior Art: | A | .0063 | .617 | .000 | .009 | .018 | .246 |
| | B | .0045 | .637 | .032 | .184 | .020 | .408 |
| | C | .0040 | .637 | .028 | .176 | .018 | .406 |
| | D | .0035 | .650 | .046 | .260 | .019 | .409 |
| | E | .0030 | .663 | .055 | .269 | .019 | .414 |
| | F | .0031 | .680 | .042 | .268 | .020 | .423 |
| Present Invention: | A | .0061 | .630 | .000 | .004 | .017 | .289 |
| | B | .0050 | .636 | .027 | .188 | .022 | .392 |
| | C | .0033 | .640 | .024 | .194 | .018 | .396 |
| | D | .0032 | .648 | .051 | .274 | .019 | .411 |
| | F | .0032 | .670 | .044 | .278 | .018 | .429 |

A sample: turndown in the BOF metal before tap
B sample: after tap into the ladle
C sample: after LMF five minute preheat
D sample: first check
E sample: second check
F sample: caster The slag chemistries listed in Table 4 provides a comparison between the calcium aluminate practice and the recycled LMF slag of the present invention, described in Table 1. The "A" samples were taken while the steel is in the BOF, with no refining addition; this is known as the "turndown." The steel at this point is covered with BOF slag. The "B" samples were taken immediately after tapping the steel into the ladle from the BOF. The "B" samples contain the ladle refining addition. This sample reflects the contributions of the materials added at the tap and the carryover furnace slag if present.

The high carbon heats illustrated in Table 4 above usually have less carryover than low carbon heats due to the decreased iron oxide levels in the carryover or turndown slag. The lack of this fluxing oxide causes the turndown slags to be less fluid and easier to contain in the furnace upon tapping. The "B" sample also precludes LMF heating therefore a liquid sample will show what compounds have gone easily into solution. The "C" samples were taken at the LMF after a 5 minute arc treatment. This preheat allows the remaining solid refining addition components of the LMF slag to melt into the fluid layer for maximum refining ability before additional slag-forming compounds or alloys are added. Metal chemistry and temperatures were determined so that the final LMF treatment can be applied, if necessary, before shipment of the ladle to the caster. Another ladle sample was taken, the "D" sample, to determine whether further treatment at the LMF was necessary. Further treatment was necessary when using the calcined aluminate practice of the prior art. Sample "E" reflects the steel analysis after this additional treatment.

The analysis in Table 4 illustrates the change in slag chemistries throughout the steps of ladle treatment. The change in percentages between the "B" and "C" samples (Table 4, slag of present invention) indicates the degree of assimilation of the individual slag forming materials immediately upon tap. The changes between the "B" and "C" samples in each respective case in Table 4 are of substantially the same magnitude. This indicates that the LMF recycled slag functions to the same level of effectiveness in a slag fluxing capacity as the premium prior art calcium aluminate slag material. In both cases the slag was therefore available to efficiently function as an insulating and refining cover prior to LMF heat treatment. The equivalent performance obtained by the recycled LMF slag was achieved at a significantly reduced cost. The recycled LMF slag is approximate of the one-fifth the cost of premium, premelted calcium aluminate used in Example 1.

The slag and metal analyses also addresses the question of reversion of phosphorus and sulfur from the recycled slag. All heat specifications were met in both examples. As indicated by the relative phosphorus levels in the recycled LMF slag (Table 4, sample D, 0.06) and carryover vessel slag (Table 4, sample A, 0.93), the bulk of available phosphorus comes from the carryover slag. This emphasizes the need to properly control the amount of vessel slag carried over into the refining ladle. Only a small portion of the full sulfur capacity for each slag was used to achieve excellent sulfur results in both cases. That is, a fully saturated slag of these slag compositions can contain up to about 1% to about 2% S by weight. Although the extra silica introduced by the stove brick in the recycled LMF slag addition a caused slight increase in the final briquetted recycled LMF slag silica level with respect to the prior art, this did not appear to be detrimental to the desulfurizing performance of the top slag. See Table 4, Present Invention Silica, D, 7.4% v. Prior Art Silica, D, 6.1%.

EXAMPLE 2

A slag conditioning product was run where the product consisted of a briquetted mixture of 20% high grade aluminum, 15% limestone, 15% lime and 50% recycled LMF slag. It was run on similar consecutive heats in a comparative trial against a granular product containing 20% aluminum and 80% limestone. Slag sample "C" was taken for comparison of the slag deoxidation levels after the 5 min. arc preheat at the LMF station.

| Slag conditioner type/ weight(lbs) | Steel $O_2$ ppm | "C" Slag Chemistry | | | | |
|---|---|---|---|---|---|---|
| | | FeO | MnO | $Al_2O_3$ | CaO | $SiO_2$ |
| granular/1600 | 780 | 0.86 | 0.09 | 26.6 | 57.7 | 2.3 |

-continued

| Slag conditioner type/ weight(lbs) | Steel $O_2$ ppm | "C" Slag Chemistry | | | | |
|---|---|---|---|---|---|---|
| | | FeO | MnO | $Al_2O_3$ | CaO | $SiO_2$ |
| briquette/1200 | 800 | 0.57 | 0.13 | 27.4 | 54.3 | 3.1 |

This slag conditioner test was run under typical addition conditions where the steel and BOF carryover slag were completely in the ladle before addition of the slag conditioner in 50 pound bags additive was added onto the ladle surface. The amount of conditioner added to the heat was dictated by the in-house schedule of additions whereby the weight applied is twice the dissolved oxygen ppm in the steel at vessel turndown prior to tap. According to the schedule of additions, the quantity of slag conditioner required in both cases was approximately 1600 pounds. Importantly, roughly equivalent slag deoxidation was achieved with 25% less of the briquetted recycled LMF slag conditioner of the present invention being utilized. It is considered that in addition to the recycled LMF slag acting as a flux which envelopes the individual addition components within a liquid slag layer to increase reaction efficiencies, the displacement of large amounts of limestone by LMF slag was additionally advantageous through the limitation of excess gas generation via the decomposing limestone. As this material absorbs the heat required for the gasification of the limestone, it causes an additional chilling effect which locally lowers the slag temperature in the slag layer. This chilling effect is considered to cause thickening and minor solidification areas in the slag which effectively decreases the reaction rate and prolongs the deoxidation reaction. This in turn allows more time for any previously unreacted aluminum to react with the atmosphere rather than with the iron oxide in the slag. Additionally, the decrease in carbon dioxide gas generated through decreased limestone use helps to maximize the efficiency of the aluminum/iron oxide reduction reaction by further avoiding excess oxygen contamination within the body of the slag from the carbon dioxide generated. This additionally leads to lower dust, smoke and fume generation and the attendant loss of fines. A further advantage of the use of recycled LMF slag as a flux in slag conditioning reactions is that when stirred into the steel/slag interface, it additionally helps flux any BOF carryover slag which may have cooled and partially solidified on the steel surface. Once this portion of the BOF carryover slag has melted, complete reaction with the full body of carryover slag will be facilitated.

ADDITIONAL EXAMPLES

Additional LMF additives can be made and used as described below.

| | Composition of Additions | | | | |
|---|---|---|---|---|---|
| | (1) | (2) | (3) | (4) | (5) |
| Synthetic Addition | | | | | |
| LMF Slag | 50% | 75% | 50% | 25% | 20% |
| CaO | 50% | | 25% | 50% | 60% |
| $Al_2O_3$ | | 25% | 25% | 15% | 15% |
| $CaF_2$ | | | | 10% | 5% |
| Desulfurizing Addition | | | | | |
| LMF Slag | 43% | 35% | 50% | 20% | 40% |
| CaO | 50% | 50% | 25% | 60% | 50% |
| $Al_2O_3$ | | | | | 5% |

-continued

| | Composition of Additions | | | | | |
|---|---|---|---|---|---|---|
| Al | 7% | 7% | 5% | 10% | | 5% |
| $CaF_2$ | | 8% | | 10% | | |
| $CaC_2$ | | | 20% | | | |
| Slag Conditioner | (1) | (2) | (3) | (4) | (5) | (6) |
| LMF Slag | 40% | 40% | 40% | 20% | 70% | 50% |
| CaO | 20% | 10% | 25% | 40% | | 30% |
| Al | 20% | 20% | 25% | 30% | 20% | 20% |
| $CaF_2$ | | | | 10% | | |
| $CaC_2$ | 20% | | | | | |
| $CaCO_3$ (as limestone) | | 30% | 10% | | 10% | |

It will occur to those skilled in the art that the ladle covering compounds disclosed herein may be used additionally in any melting furnace as an instant artificial slag acting as a metal refining agent. It will also be apparent to those skilled in the art that various modifications to the invention as previously described may be made therein without departing from the spirit of the invention.

We claim:

1. In a process of ladle refining of steel comprising the steps of disposing in a ladle a quantity of molten steel to be refined, adding a material which forms a covering of a molten protective ladle metallurgy slag on the steel in the ladle and refining the steel in the ladle to the desired metallurgical condition, the improvement comprising: adding as the ladle metallurgy furnace additive a solid material comprising from about 10% to about 90% of a solid recycled ladle metallurgy furnace slag and from about 10% to about 90% of a raw material selected from the group consisting of: a calcium oxide source; soda ash; fluorspar; borax; calcium aluminate; an aluminum source; an alumina source; calcium carbonate; metallic calcium, magnesium, and sodium and their oxides, fluorides and carbides; and mixtures of all the foregoing.

2. The process of claim 1, wherein an analysis of the recycled ladle metallurgy slag comprises from about 35% to about 65% CaO; from about 10% to about 35% $Al_2O_3$; from about 1% to about 10% $SiO_2$; from about 3% to about 15% MgO; from about 0.3% to about 10% FeO; from about 0.1% to about 5% MnO; from about 0.01% to about 0.15% $P_2O_5$; and from about 0.1% to about 0.5% S.

3. The process of claim 1, wherein the alumina source is selected from the group consisting of alumina, bauxite, recycled waste alumina, waste refractory blast stove brick and calcined alumina.

4. The process of claim 1, wherein the aluminum source is selected from the group consisting of aluminum, aluminum scrap, aluminum wire, aluminum powder, aluminum shavings, aluminum punchings, aluminum dross, aluminum pit solids, chemically reduced alumina slags, aluminum baghouse dust and recycled aluminum waste sources.

5. The process of claim 1, wherein the calcium oxide source is selected from the group consisting of calcium oxide, lime, limestone, dolomite, and dolomitic lime.

6. The process of claim 1, wherein the ladle metallurgy additive comprises from about 20% to about 60% recycled ladle metallurgy furnace slag.

7. The process of claim 1, wherein the ladle metallurgy additive comprises about 50% recycled ladle metallurgy furnace slag.

8. The process of claim 1, wherein the ladle metallurgy additive is a synthetic slag comprising from about 10% to about 90% recycled ladle metallurgy furnace slag, a calcium oxide source sufficient to provide from about 0% to about 90% of calcium oxide, and an alumina source sufficient to provide from about 0% to about 80% of alumina, wherein the calcium oxide and the alumina are not both 0% at the same time.

9. The process according to claim 8, wherein the ladle metallurgy additive comprises from about 20% to about 80% recycled ladle metallurgy furnace slag, a calcium oxide source sufficient to provide from about 0% to about 55% of calcium oxide, and an alumina source sufficient to provide from about 0% to about 55% of alumina, wherein either the calcium oxide or the alumina is at least about 10%.

10. The process according to claim 8, wherein the ladle metallurgy additive comprises from about 30% to about 60% recycled ladle metallurgy furnace slag, a calcium oxide source sufficient to provide from about 0% to about 55% of calcium oxide, and an alumina source sufficient to provide from about 0% to about 55% of alumina, wherein either the calcium oxide or the alumina is at least about 10%.

11. The process according to claim 8, wherein the ladle metallurgy additive comprises from about 40% to about 55% recycled ladle metallurgy furnace slag, a calcium oxide source sufficient to provide from about 0% to about 50% of calcium oxide, and an alumina source sufficient to provide from about 0% to about 50% of alumina, wherein either the calcium oxide and the alumina is at least about 10%.

12. The process according to claim 8, wherein the ladle metallurgy additive comprises about 50% recycled ladle metallurgy furnace slag, a calcium oxide source sufficient to provide about 25% of calcium oxide, and an alumina source sufficient to provide about 25% of alumina.

13. The process of claim 1, wherein the ladle metallurgy additive is a slag conditioner comprising from about 10% to about 90% recycled ladle metallurgy furnace slag, a calcium oxide source sufficient to provide from about 0% to about 90% of calcium oxide, an alumina source sufficient to provide from about 0% to about 80% of alumina, wherein the calcium oxide and the alumina are not both 0% at the same time, and an aluminum source sufficient to provide from about 1% to about 70% aluminum.

14. The process as claimed in claim 1, wherein the ladle metallurgy additive is a slag conditioner comprising from about 10% to about 90% recycled ladle metallurgy furnace slag, a calcium oxide source sufficient to provide from about 0% to about 60% of calcium oxide, an alumina source sufficient to provide from about 0% to about 60% of alumina, wherein the calcium oxide and the alumina are not both 0% at the same time, and a source sufficient to provide from about 10% to about 70% of a source of metal selected from the group consisting of aluminum, calcium, sodium, magnesium, and calcium carbide and mixtures of the foregoing.

15. The process according to claim 14, wherein the ladle metallurgy additive comprises from about 20% to about 60% recycled ladle metallurgy furnace slag, a calcium oxide source sufficient to provide from about 20% to about 60% of calcium oxide, an alumina sufficient to provide from about 0% to about 30% of alumina, from about 0% to about 10% fluorspar and an aluminum source sufficient to provide from about 10% to about 50% of aluminum.

16. The process according to claim 15, wherein the aluminum content in the ladle metallurgy additive is from about 15% to about 30% of the additive.

17. The process as claimed in claim 1, wherein the ladle metallurgy additive is a desulfurizing additive comprising from about 10% to about 60% of recycled ladle metallurgy furnace slag, a calcium oxide source sufficient to provide from about 10% to about 90% of calcium oxide, an alumina source sufficient to provide from about 0% to about 50% of alumina, and a source sufficient to provide from about 1% to about 20% of a source of metal selected from the group consisting of aluminum, calcium, sodium, magnesium and calcium carbide and mixtures of the foregoing.

18. The process according to claim 17, wherein the ladle metallurgy additive is a desulfurizing additive comprising from about 20% to about 60% recycled ladle metallurgy furnace slag, an aluminum source sufficient to provide from about 4% to about 12% of aluminum, a calcium oxide source sufficient to provide from about 20% to about 60% of calcium oxide, an alumina source sufficient to provide from about 0% to about 20% of alumina, and from about 0% to about 20% of fluorspar.

19. The process according to claim 18, wherein the ladle metallurgy additive comprises from about 30% to about 50% of recycled ladle metallurgy furnace slag, an aluminum source sufficient to provide from about 5% to about 10% of aluminum, a calcium oxide source sufficient to provide from about 30% to about 50% of calcium oxide, an alumina source sufficient to provide from about 0% to about 10% of alumina, and from 0% to about 10% of fluorspar.

20. The process according to claim 19, wherein the aluminum content is about 7%.

21. The process according to claim 1, wherein the ladle metallurgy addition comprises particles that pass through a screen having four inch square openings.

22. The process according to claim 1, wherein the solid ladle metallurgy additive is in the form of a briquette.

23. The process according to claim 1, wherein the ladle metallurgy additive is a completely mixed granular material that is predominately no larger than material that passes through a screen having one-inch square openings and no smaller than that which is retained by a 20-mesh screen.

24. The process according to claim 1, wherein the process further comprises adding the recycled ladle metallurgy additive to the molten steel in granular form in at least two separate steps wherein a substantial portion of the granular recycled ladle metallurgy furnace slag is added before the raw materials.

25. A solid ladle metallurgy furnace additive for use in a treating molten steel in a ladle metallurgy furnace comprising from about 10% to about 90% by weight of a solid recycled ladle metallurgy furnace slag material and from about 10% to about 90% by weight of a raw material selected from the group consisting of: a calcium oxide source; soda ash; fluorspar; borax; an aluminum; an alumina source; calcium carbonate; calcium aluminate; metallic calcium, magnesium, and sodium and their oxides, fluorides and carbides; and mixtures of all of the foregoing.

26. The additive according to claim 25, wherein the recycled ladle metallurgy slag comprises from about 35% to about 65% CaO; from about 10% to about 35% $Al_2O_3$; from about 1% to about 10% $SiO_2$; from about 3% to about 15% MgO; from about 0.3% to about 10% FeO; from about 0.1% to about 5% MnO; from about 0.01% to about 0.15% $P_2O_5$; and from about 0.1% to about 0.5% S.

27. The additive according to claim 25, wherein the alumina source is selected from the group consisting of alumina, bauxite, recycled waste alumina, waste refractory blast stove brick and calcined alumina.

28. The additive according claim 25, wherein the aluminum source is selected from the group consisting of aluminum, aluminum scrap, aluminum wire, aluminum powder, aluminum shavings, aluminum punchings, aluminum dross, aluminum pit solids, chemically reduced alumina slags, aluminum baghouse dust and recycled aluminum waste sources.

29. The additive according to claim 25, wherein the calcium oxide source is selected from the group consisting of calcium oxide, lime, limestone, dolomite, and dolomitic lime.

30. The additive according to claim 25, wherein the ladle metallurgy additive comprises from about 20% to about 60% recycled metallurgy furnace slag.

31. The additive according to claim 25, wherein the ladle metallurgy additive comprises about 50% recycled ladle metallurgy furnace slag.

32. The additive according to claim 25, wherein the ladle metallurgy additive is a synthetic slag comprising from about 10% to about 90% recycled ladle metallurgy furnace slag, a calcium oxide source sufficient to provide from about 0% to about 90% of calcium oxide, and an alumina source sufficient to provide from about 0% to about 80% of alumina, wherein the calcium oxide and the alumina are not both 0% at the same time.

33. The additive according to claim 32, wherein the ladle metallurgy additive comprises from about 20% to about 80% recycled ladle metallurgy furnace slag, a calcium oxide source sufficient to provide from about 0% to about 55% of calcium oxide, and an alumina source sufficient to provide from about 0% to about 55% of alumina, wherein either the calcium oxide or the alumina is at least about 10%.

34. The additive according to claim 32, wherein the ladle metallurgy additive comprises from about 30% to about 60% recycled ladle metallurgy furnace slag, a calcium oxide source sufficient provide from about 0% to about 45% of calcium oxide, and an alumina source sufficient to provide from about 0% to above 45% of alumina, wherein either the calcium oxide or the alumina is at least about 10%.

35. The additive according to claim 32, wherein the ladle metallurgy additive comprises from about 40% to about 55% recycled ladle metallurgy furnace slag, a calcium oxide-source sufficient to provide from about 0% to about 50% of calcium oxide, and an alumina source sufficient to provide from about 0% to about 50% of alumina, wherein either the calcium oxide or the alumina is at least about 10%.

36. The additive according to claim 32, wherein the ladle metallurgy additive comprises about 50% recycled ladle metallurgy furnace slag, a calcium oxide source sufficient to provide about 25% of calcium oxide, and an alumina source sufficient to provide about 25% of alumina.

37. The additive of claim 25, wherein the ladle metallurgy additive is a slag conditioner comprising from about 10% to about 90% recycled ladle metallurgy furnace slag, a calcium oxide source sufficient to provide from about 0% to about 90% of calcium oxide, an alumina source sufficient to provide from about 0% to about 80% of alumina, wherein the calcium oxide and the alumina are not both 0% at the same time, and an aluminum source sufficient to provide from about 1% to about 70% aluminum.

38. The additive according to claim 25, wherein the ladle metallurgy additive is a slag conditioner comprising from about 10% to about 90% recycled ladle metallurgy furnace slag, a calcium oxide source from about 0% to about 60% of calcium oxide, an alumina source sufficient to provide from about 0% to about 60% of alumina, wherein the calcium oxide and the alumina are not both 0% at the same time, and a source sufficient to provide from about 10% to about 70% of a source of metal selected from the group consisting of aluminum, calcium, sodium, magnesium, and calcium carbide and mixtures of the foregoing.

39. The additive according to claim 38, wherein the ladle metallurgy additive comprises from about 20% to about 60% recycled ladle metallurgy furnace slag, a calcium oxide source sufficient to provide from about 20% to about 60% of calcium oxide, an alumina source sufficient to provide from about 0% to about 30% of alumina, from about 0% to about 10% fluorspar and an aluminum source sufficient to provide from about 10% to about 50% of aluminum.

40. The additive according to claim 39, wherein the aluminum content in the ladle metallurgy additive is from about 15% to about 30% of the additive.

41. The additive as claimed in claim 25, wherein the ladle metallurgy additive is a desulfurizing additive comprising from about 10% to about 60% of recycled ladle metallurgy furnace slag, a calcium oxide source sufficient to provide from about 10% to about 90% of calcium oxide, an alumina source sufficient to provide from about 0% to about 50% of alumina, and a source sufficient to provide from about 1% to about 20% of a source of metal selected from the group consisting of aluminum, calcium, sodium, magnesium and calcium carbide and mixtures of the foregoing.

42. The additive according to claim 25, wherein the ladle metallurgy additive is a desulfurizing additive comprises from about 20% to about 60% recycled ladle metallurgy furnace slag, an aluminum source sufficient to provide from about 4% to about 12% of aluminum, a calcium oxide source sufficient to provide from about 20% to about 60% of calcium oxide, an alumina source sufficient to provide from about 0% to about 20% of alumina, and from about 0% to about 20% of fluorspar.

43. The additive according to claim 42, wherein the ladle metallurgy additive comprises from about 30% to about 50% of recycled ladle metallurgy furnace slag, an aluminum source sufficient to provide from about 5% to about 10% of aluminum, a calcium oxide source sufficient to provide from about 30% to about 50% of calcium oxide, an alumina source sufficient to provide from about 0% to about 10% of alumina, and from 0% to about 10% of fluorspar.

44. The additive according to claim 43, wherein the aluminum content is about 7%.

45. The additive as claimed in claim 25, wherein the ladle metallurgy additive is a desulfurizing additive comprising from about 10% to about 60% of recycled ladle metallurgy furnace slag, a calcium oxide source sufficient to provide from about 10% to about 80% of calcium oxide, an alumina source to sufficient to provide from about 0% to about 50% of alumina, and from about 10% to about 80% calcium carbide.

46. The additive as claimed in claim 25, wherein the ladle metallurgy additive is a slag conditioner comprising from about 10% to about 90% recycled ladle metallurgy furnace slag, a calcium oxide source sufficient to provide from about 0% to about 60% of calcium oxide, an alumina source sufficient to provide from about 0% to about 60% of alumina, wherein the calcium oxide and the alumina are not both 0% at the same time, and from about 10% to about 90% calcium carbide.

47. The process as claimed in claim 1, wherein the ladle metallurgy additive is a slag conditioner comprising from about 10% to about 90% recycled ladle metallurgy furnace slag, a calcium oxide sufficient to provide from about 0% to about 60% of calcium oxide, an alumina source sufficient to provide from about 0% to about 60% of alumina, wherein the calcium oxide and the alumina are not both 0% at the same time, and from about 10% to about 90% calcium carbide.

48. The process according to claim 1, wherein the ladle metallurgy additive is a desulfurizing additive comprising from 10% to about 60% of recycled ladle metallurgy furnace slag, a calcium oxide source sufficient to provide from about 10% to about 80% of calcium oxide, an alumina source sufficient to provide from about 0% to about 50% of alumina, and from about 10% to about 80% of calcium carbide.

* * * * *